United States Patent
Tang et al.

(10) Patent No.: US 11,742,554 B2
(45) Date of Patent: Aug. 29, 2023

(54) BATTERY

(71) Applicant: Ningde Amperex Technology Ltd., Ningde (CN)

(72) Inventors: ChunJun Tang, Ningde (CN); GuoWen Zhang, Ningde (CN); GuiCheng Li, Ningde (CN)

(73) Assignee: NINGDE AMPEREX TECHNOLOGY LTD., Ningde (CN)

( * ) Notice: Subject to any disclaimer, the term of this patent is extended or adjusted under 35 U.S.C. 154(b) by 118 days.

(21) Appl. No.: 16/628,012

(22) PCT Filed: Nov. 27, 2019

(86) PCT No.: PCT/CN2019/121281
§ 371 (c)(1),
(2) Date: Dec. 31, 2019

(87) PCT Pub. No.: WO2021/051653
PCT Pub. Date: Mar. 25, 2021

(65) Prior Publication Data
US 2021/0367310 A1    Nov. 25, 2021

(30) Foreign Application Priority Data
Sep. 19, 2019   (CN) .......................... 201910888937.X

(51) Int. Cl.
*H01M 50/547*    (2021.01)
*H01M 50/107*    (2021.01)
*H01M 50/179*    (2021.01)

(52) U.S. Cl.
CPC ....... *H01M 50/547* (2021.01); *H01M 50/107* (2021.01); *H01M 50/179* (2021.01)

(58) Field of Classification Search
None
See application file for complete search history.

(56) References Cited

U.S. PATENT DOCUMENTS

2004/0127952 A1    7/2004   O'Phelan et al.
2010/0297495 A1   11/2010   Casby et al.
(Continued)

FOREIGN PATENT DOCUMENTS

| CN | 201887117 U | 6/2011 |
| CN | 202940279 U | 5/2013 |

(Continued)

OTHER PUBLICATIONS

PAT201909075WO1—International Search Report dated Sep. 19, 2019.

(Continued)

*Primary Examiner* — Carmen V Lyles-Irving
(74) *Attorney, Agent, or Firm* — Ladas & Parry LLP

(57) ABSTRACT

A battery includes a battery cell and a terminal post. The first casing includes a first arc sidewall and a flat sidewall connected to the first arc sidewall and the first sidewall. The terminal post is disposed on the flat sidewall. Instead of disposing the terminal post on top of the battery, increased thickness of the battery due to the terminal post is avoided in the present disclosure. The internal space of an electrode device can be fully utilized. In addition, it can prevent the terminal post from occupying the top of the battery and decreasing the number of the electrode plates. Thus, the present disclosure can avoid the reduce of the number of the electrode plates and increase the energy density of the battery.

15 Claims, 6 Drawing Sheets

(56) References Cited

U.S. PATENT DOCUMENTS

| | | | |
|---|---|---|---|
| 2012/0270091 A1 | 10/2012 | Kuhn et al. | |
| 2016/0013455 A1* | 1/2016 | Shiu | H01M 4/70 |
| | | | 156/227 |
| 2016/0293995 A1 | 10/2016 | Pasma et al. | |
| 2017/0263971 A1 | 9/2017 | O'Phelan et al. | |
| 2018/0366716 A1* | 12/2018 | Gong | H01M 50/3425 |
| 2019/0027775 A1* | 1/2019 | O'Phelan | H01M 6/005 |
| 2020/0168886 A1* | 5/2020 | Sato | H01M 10/0525 |

FOREIGN PATENT DOCUMENTS

| | | |
|---|---|---|
| CN | 203521496 U | 4/2014 |
| CN | 103959507 A | 7/2014 |
| CN | 204333058 U | 5/2015 |
| CN | 205016623 U | 2/2016 |
| CN | 105789547 A | 7/2016 |
| CN | 206059542 U | 3/2017 |
| CN | 208970566 U | 6/2019 |
| CN | 111052454 A | 4/2020 |
| EP | 2 706 592 A1 | 3/2014 |
| EP | 2706592 A1 | 3/2014 |
| JP | 06-050630 A | 6/1994 |
| JP | 2006512745 A | 4/2006 |
| JP | 2007208137 A | 8/2007 |
| JP | 2009224173 A | 10/2009 |
| JP | 2011216420 A | 10/2011 |
| JP | 2014232666 A | 12/2014 |
| JP | 2016-029609 A | 3/2016 |
| JP | 2016058215 A | 4/2016 |
| JP | 2017068989 A | 4/2017 |
| KR | 20160054924 A | 5/2016 |
| KR | 10-2017-0122289 | 11/2017 |
| WO | 2018/173751 A1 | 9/2018 |
| WO | 2018173751 A1 | 9/2018 |

OTHER PUBLICATIONS

International Search Report for Application PCTICN2019/121281, dated Jun. 19, 2020.
Japanese Patent Office Notice of Reasons of Refusal for Application JP2020516568, dated Dec. 21, 2021.
Japanese Patent Office Notice of Reasons of Refusal for Application JP2020516568, dated Jun. 28, 2022.
Korean Notice of Allowance for Application KR 10-2020-7007673, dated Oct. 29, 2021.
Indian Office Action for Application IN 202017012932, dated May 5, 2022.
Chinese Office Action for Application CN 201910888937.X, dated Aug. 3, 2020.
First Office Action of CN application No. 202110335666.2, dated Apr. 25, 2023.
First Office Action of CN application No. 202110335667.7, dated Apr. 26, 2023.
Decision to Grant a Patent, JP application No. 2020-516568, dated May 30, 2023.

* cited by examiner

BATTERY

FIELD

The disclosure relates to electrochemistry, and more particularly, to a battery.

BACKGROUND

Batteries are widely used in portable electronic devices due to the portability. The battery generally includes a casing, a top cover, and a battery cell. The battery cell is received in the casing. The top cover is fixed in a top opening of the casing. A terminal post is inserted into the top cover, and is electrically connected to the battery cell to supply electric power to outside components. However, the terminal post may increase the thickness of the battery, which results in a loss of energy density.

SUMMARY

What is needed is a battery with increased energy density.

The present disclosure provides a battery including a battery cell, a first casing, and a second casing mounted to the first casing. The first casing and the second casing cooperatively form a cavity for receiving the battery cell. Wherein the first casing includes a first end surface, a first arc sidewall, and a first sidewall; and the first arc sidewall is connected to the first sidewall. The first end surface and the second casing are disposed at opposite sides of the first arc sidewall and the first sidewall. The first end surface is connected to the first arc sidewall and the first sidewall. The battery further includes a terminal post disposed on the first sidewall.

In the present disclosure, by disposing the terminal post on the first sidewall and not on the top of the battery as found in conventional art, increased thickness of the battery due to the terminal post is avoided. The internal space of an electrode device can be fully utilized. In addition, it can prevent the terminal post from occupying the top space of the battery and decreasing the number of the electrode plates. Thus, the present disclosure can avoid the reduce of the number of the electrode plates and increase the energy density of the battery.

In some embodiments, the first sidewall includes at least one of a second arc sidewall and a flat sidewall. Three embodiments are included. A first embodiment is that the first sidewall is the second arc sidewall and the terminal post is disposed on the second arc sidewall. A second embodiment is that the first sidewall is the flat sidewall and the terminal post is disposed on the flat sidewall. A third embodiment is that the first sidewall includes the second arc sidewall and the flat sidewall, and the terminal post is disposed on the flat sidewall or the second arc sidewall.

In the present disclosure, by disposing the terminal post on the flat sidewall and not on the top of the battery as found in conventional art, increased thickness of the battery due to the terminal post is avoided. The internal space of an electrode device can be fully utilized. In addition, it can prevent the terminal post from occupying the top space of the battery and decreasing the number of the electrode plates. Thus, the present disclosure can avoid the reduce of the number of the electrode plates and increase the energy density of the battery.

In some embodiments, the first sidewall includes a flat sidewall. A periphery of the first end surface includes an arc section and a straight section. The first arc sidewall is connected to the arc section. The flat sidewall is connected to the straight section, and the terminal post is disposed on the flat sidewall.

In some embodiments, a distance between the flat sidewall and a center of an imaginary circle defined by the arc section of the first end surface is less than a radius of the imaginary circle.

By limiting the distance between the flat sidewall and the center of the imaginary circle defined by the arc section of the first end surface to be less than the radius of the imaginary circle defined by the arc section of the first end surface, the terminal post can be limited to be within a circumcircle of the flat sidewall, which causes the internal space of the electrode device to further be fully utilized.

In some embodiments, a ratio of the distance between the flat sidewall and the center of the imaginary circle with respect to the radius of the imaginary circle is between 4:5 and 9:10.

In some embodiments, the terminal post includes a terminal post end parallel to the flat sidewall. A center of the terminal post end is disposed on or above a center of the flat sidewall along a height direction of the flat sidewall, and/or the center of the terminal post end is aligned with a center of the flat sidewall along a width direction of the flat sidewall. Disposing the center of the terminal post end to be on or above the center of the flat sidewall along the height direction of the flat sidewall can facilitates electrically connecting the terminal post to the electrode tabs. Enough space can be reserved for the soldering of the electrode tabs and the terminal post. Disposing the center of the terminal post end to be aligned with the center of the flat sidewall along the width direction of the flat sidewall can prevent the terminal post from being beyond the circumcircle of the flat sidewall, which causes the internal space of the electrode device to further be fully utilized.

In some embodiments, the terminal post end is circular, oval, rectangular, or triangular.

In some embodiments, the terminal post protrudes from the flat sidewall by 0.3 mm to 10 mm.

In some embodiments, a height of the terminal post, which is perpendicular to the flat sidewall, is 0.6 mm to 20 mm.

In some embodiments, the terminal post includes a first terminal post portion and a second terminal post portion. The first terminal post portion includes a first terminal post end and a first cylinder connected to the first terminal post end. The second terminal post portion includes a second terminal post end and a second cylinder connected to the second terminal post end, the second cylinder is hollow, and the first cylinder is inserted into the second cylinder. Dividing the terminal post into the first terminal post portion and the second terminal post portion can facilitate the mounting of the terminal post. The first terminal post portion and the second terminal post portion matching in structure can ensure the stability of the mounting of the terminal post. The first cylinder can also be a hollow cylinder, which can decrease the depth of soldering when the terminal post and the first electrode tabs are soldered, and also makes the soldered structure more stable.

In some embodiments, the battery further includes an insulating member disposed between the terminal post and the flat sidewall, and the insulating member is integrally formed with or made separately.

In some embodiments, the battery cell further includes a plurality of first electrode tabs, each of the plurality of first electrode tabs is directly and electrically connected to the terminal post or electrically connected to the terminal post through a transfer soldering member. Directly electrically connecting the first electrode tabs to the terminal post can eliminate the use of the transfer soldering member, and further eliminate the space for receiving the transfer soldering member.

In some embodiments, an insulating adhesive is disposed on the plurality of first electrode tabs. A short circuit, which is caused by contact between the plurality of first electrode tabs and the first casing, is thus avoided.

In some embodiments, the battery cell further includes a plurality of second electrode tabs, each of the plurality of second tabs is electrically connected to the first casing or the second casing, and an angle between an extending direction of the plurality of first electrode tabs and an extending direction of the plurality of second electrode tabs is greater than 0 degree and less than or equal to 180 degree.

In some embodiments, the first casing includes two flat sidewalls, one of the two flat sidewalls faces the plurality of first electrode tabs, and another one of the two flat sidewalls faces the plurality of second electrode tabs. The energy density of the battery can further be increased.

In some embodiments, a gap is defined around each of the plurality of first electrode tabs and the plurality of second electrode tabs, and the battery further includes a liquid injection hole disposed on the second casing and facing the gap around the plurality of first electrode tabs. Thus, the injection of the electrolyte is not hindered.

In some embodiments, the liquid injection hole is disposed on a second end surface of the second casing, and faces the gap around the plurality of first electrode tabs.

BRIEF DESCRIPTION OF THE DRAWINGS

Implementations of the present disclosure will now be described, by way of embodiments, with reference to the attached figures.

Description of symbols for main elements: 1 represents a first casing, 11 represents a first arc sidewall, 12 represents a flat sidewall, 13 represents a first end surface, 131 represents an arc section, 132 represents a straight section, 2 represents a second casing, 21 represents a terminal post end, 22 represents a first terminal post portion, 221 represents a first cylinder, 23 represents a second terminal post portion, 231 represents a second cylinder, 24 represents a mounting hole, 4 represents a first insulating member, 5 represents a battery cell, 6 represents a first electrode tab, 61 represents an insulating adhesive, 62 represents a transfer soldering member, 7 represents a second electrode tab, 8 represents a liquid injection hole, 9 represents an explosion relief valve, and 10 represents a gap.

Implementations of the disclosure will now be described, with reference to the drawings.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are not to be considered as limiting the scope of the embodiments.

Implementations of the disclosure will now be described, by way of embodiments only, with reference to the drawings. It should be noted that non-conflicting details and features in the embodiments of the present disclosure may be combined with each other.

Figure 1:
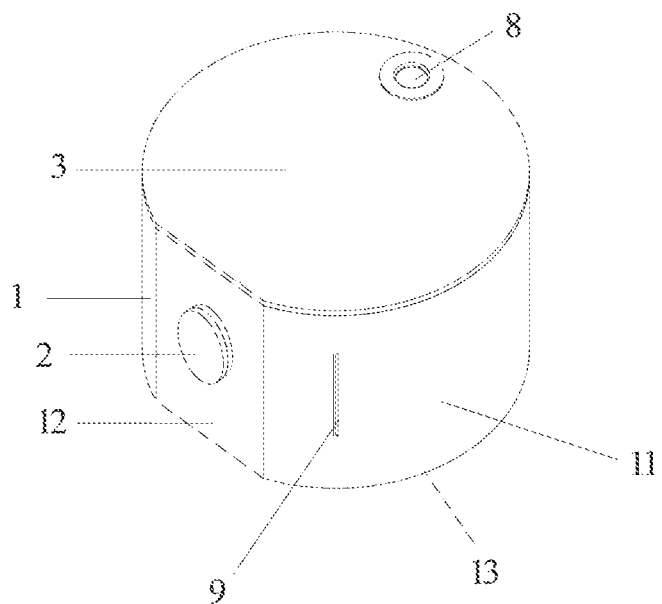
FIG. 1 is a perspective view of an embodiment of a battery according to the present disclosure.
Figure 7:
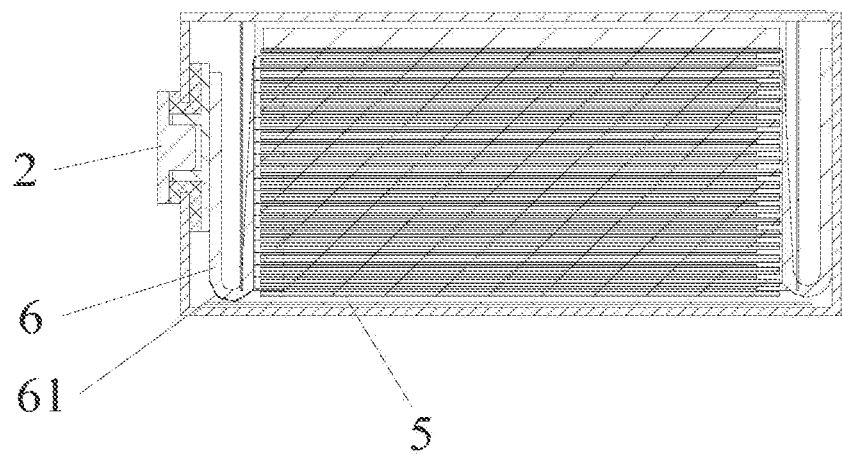
FIG. 7 is a cross-sectional view along A-A of FIG. 6.

FIGS. 1 and 7 illustrate an embodiment of a battery, which is a button battery. The button battery includes a first casing 1, a second casing 3, a battery cell 5, and a terminal post 2. The terminal post 2 is disposed on the first casing 1. In detail, the first casing 1 includes a first arc sidewall 11 and a first sidewall. In the embodiment, the first sidewall is a flat sidewall 12). The flat sidewall 12 is connected to the first arc sidewall 11. The terminal post 2 is disposed on the flat sidewall 12.

The second casing 3 is mounted to the first casing 1. The second casing 3 and the first casing 1 cooperatively form a cavity for receiving the battery cell 5. The first casing 1 further includes a first end surface 13. The first end surface 13 is connected to the first arc sidewall 11 and the flat sidewall 12.

In the present disclosure, by disposing the terminal post 2 on the flat sidewall 12 and not on the top of the battery as found in conventional art, increased thickness of the battery due to the terminal post is avoided. The internal space of an electrode device can be fully utilized. In addition, it can prevent the terminal post from occupying the top space of the battery and decreasing the number of the electrode plates. Thus, the present disclosure can avoid the reduce of the number of the electrode plates and increase the energy density of the battery.

Referring to FIG. 1, in the present disclosure, the casing of the battery includes the first casing 1 and the second casing 3. The first casing 1 and the second casing 3 are connected together. In detail, the first casing 1 and the second casing 3 can be connected by soldering. In the embodiment, the first casing 1 and the second casing 3 can be made of metal, such as stainless steel. The thickness T of each of the first casing 1 and the second casing 3 is not greater than 1000 millimeters.

Referring to FIG. 1, in the present disclosure, the casing of the battery includes the first casing 1 and the second casing 3. The first casing 1 and the second casing 3 can be connected by soldering. In the embodiment, the first casing 1 and the second casing 3 can be made of metal, such as stainless steel. The thickness T of each of the first casing 1 and the second casing 3 is not greater than 1000 millimeters.

Figure 2:
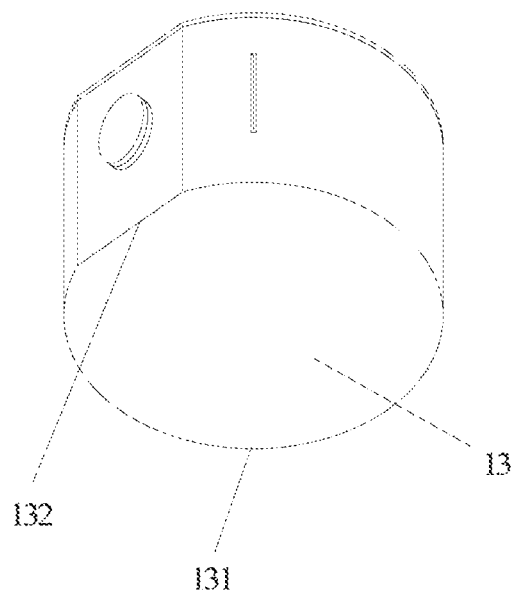
FIG. 2 is a perspective view of the battery of FIG. 1, from another angle.

Referring to FIGS. 1 and 2, the periphery of the first end surface 13 includes an arc section 131 and a straight section 132 connected to the arc section 131. The first arc sidewall 11 is connected to the arc section 131. The flat sidewall 12 is connected to the straight section 132. In at least one embodiment, the first end surface 13 is substantially an almost-complete circle cut by a short chord. However, the first end surface 13 can also be oval. The shape of the first end surface 13 is not limited in the present disclosure.

Figure 3:
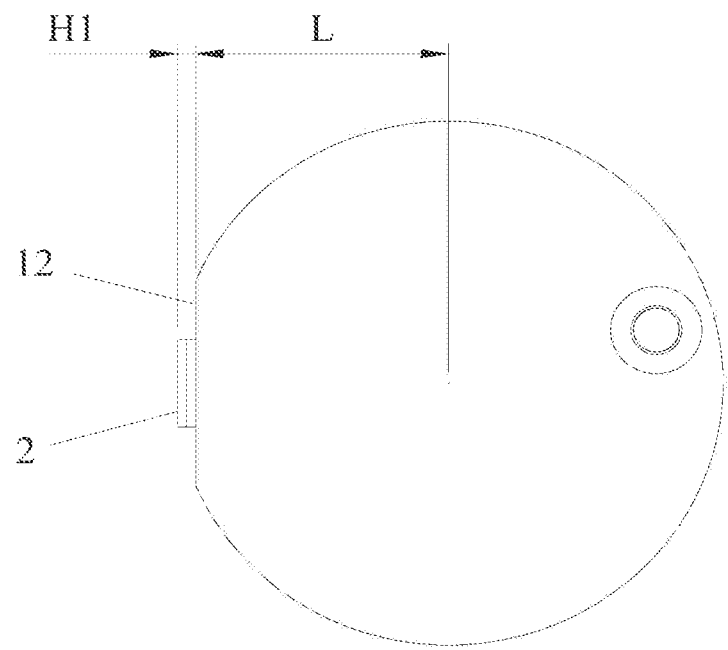
FIG. 3 is top view of the battery of FIG. 1.

Referring to FIG. 3, a distance L between the flat sidewall 12 and a center of an imaginary circle defined by the arc section 131 of the first end surface 13 is less than a radius of the imaginary circle defined by the arc section 131 of the first end surface 13. In another embodiment of the present disclosure, a ratio of the distance L between the flat sidewall 12 and the center of the imaginary circle defined by the arc section 131 of the first end surface 13 with respect to the radius of the imaginary circle defined by the arc section 131 of the first end surface 13 is between 4:5 and 9:10. The terminal post 2 is disposed within a circumcircle of the flat sidewall 12. Thus, the internal space of the electrode device can further be fully utilized.

Figure 4:
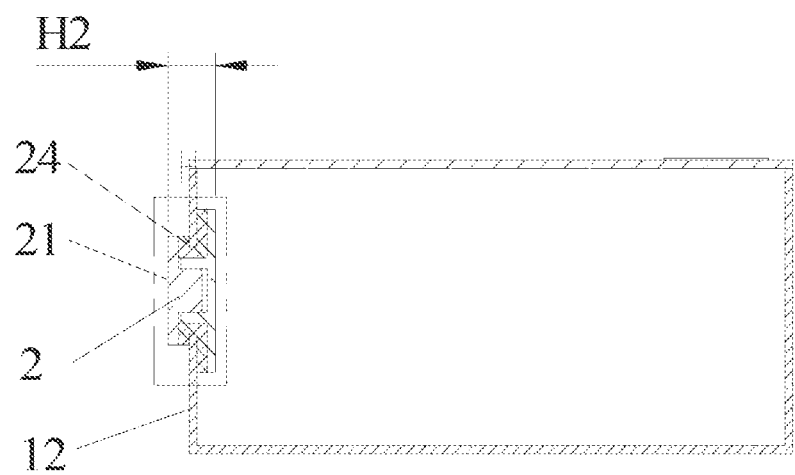
FIG. 4 is a cross-sectional view of a casing of the battery of FIG. 1.

Referring to FIGS. 3 and 4, in the embodiment, the terminal post 2 includes a terminal post end 21 parallel to the flat sidewall 12. The center of the terminal post end 21 is aligned with the center of the flat sidewall 12 along the width direction of the flat sidewall 12. The center of the flat sidewall 12 along the width direction of the flat sidewall 12 has a greatest distance to the circumcircle, which facilitates disposing the terminal post 2. The center of the terminal post end 21 is disposed on or above the center of the flat sidewall 12 along the height direction of the flat sidewall 12, which facilitates electrically connecting the terminal post 2 to the first electrode tab.

Referring to FIG. 1, in the embodiment, the terminal post end 21 of the terminal post 20 is circular, which facilitates connecting the terminal post 2 to the first casing 1. The terminal post end can also be oval, rectangular, triangular, and so on. In the embodiment, the terminal post 2 is made of a conductive material, such as metal or alloy. In detail, the terminal post 2 is made of steel alloy, aluminum alloy, iron alloy, copper alloy, and so on.

Referring to FIGS. 3 and 4, in the embodiment, the terminal post 2 protrudes from the flat sidewall 12 by a height H1 of 0.3 mm to 10 mm. The entire height H2 of the terminal post 2 is 0.6 mm to 20 mm.

Figure 5:
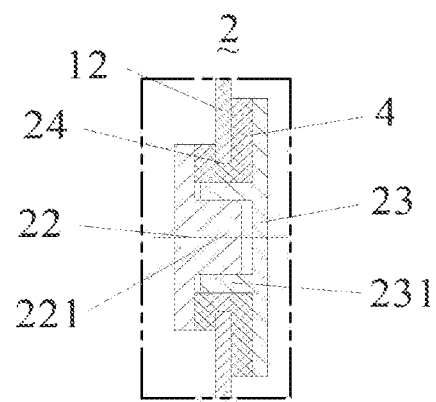
FIG. 5 is an enlarged view of a circled portion of FIG. 4.
Figure 6:
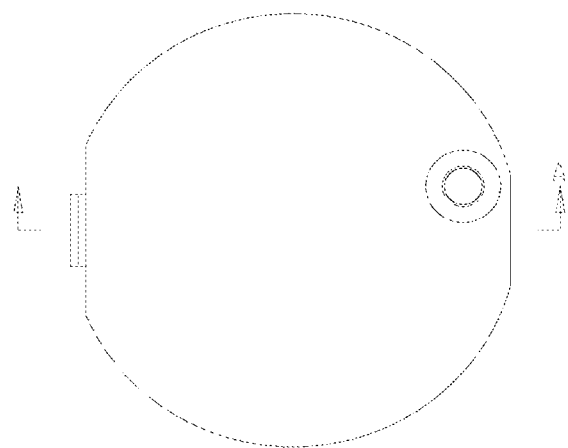
FIG. 6 is a top view of another embodiment of a battery according to the present disclosure.

Referring to FIG. 5, the terminal post 2 includes a first terminal post portion 22 and a second terminal post portion 23. The first terminal post portion 21 and the second terminal post portion 23 are connected and form an I-shape. The flat sidewall 12 defines a mounting hole 24. The mounting hole 24 is a through hole. The terminal post 2 is mounted in the mounting hole 24. The diameter of the mounting hole 24 is less than 1000 millimeters. The depth of the mounting hole 24 is less than 100 millimeters.

In detail, the first terminal post portion 22 includes a first terminal post end (that is, the above terminal post end 21) and a first cylinder 221 connected to the first terminal post end. The second terminal post portion 23 includes a second terminal post end and a second cylinder 231 connected to the second terminal post end. The second cylinder 231 is hollow. Each of the first terminal post portion 21 and the second terminal post portion 23 is T-shaped. The first cylinder 221 is inserted into the second cylinder 231 to form the I-shaped terminal post 2. The first cylinder 221 and the second cylinder 231 after being connected pass through the mounting hole 24. The first terminal post end and the second terminal post end abut against the opposite sides of the mounting hole 24. During assembly, the second cylinder 231 can first be inserted into the mounting hole 24. Then, the first cylinder 221 is inserted into the second cylinder 231. In detail, the first terminal post end (that is, the above terminal post end 21) is disposed at an outer side of the flat sidewall 12 (that is, the outer side of the battery). The second terminal post end is disposed at an inner side of the flat sidewall 12 (that is, the inner side of the battery).

In one embodiment of the present disclosure, the first cylinder 221 is a solid cylinder. The first cylinder 221 can also be a hollow cylinder. The first cylinder 221 being hollow can decrease the depth of soldering when the terminal post 2 and the first electrode tabs are soldered, which also makes the soldered structure more stable.

A first insulating member 4, which isolates the terminal post 2 from the flat sidewall 12, is disposed in the mounting hole 24. In detail, the first insulating member 4 is disposed between the first terminal post end and the flat sidewall 12, between the second cylinder 231 and the flat sidewall 12, and between the second terminal post end and the flat sidewall 12. The first insulating member 4 can be integrally formed on the flat sidewall 12 through injection molding, and can also be made separately. For example, the first insulating member 4 can include a first insulating portion and a second insulating portion. The first insulating portion is disposed among the second cylinder 231, the second terminal post end, and the flat sidewall 12. The second insulating portion is disposed among the first terminal post end and the flat sidewall 12. The first insulating member 4 can be made of polymers, such as nylon or polyfluoroalkoxy (PFA).

Referring to FIGS. 6 to 9, the battery cell 5 includes a positive electrode plate, an isolation film, and a negative electrode plate. The isolation film is disposed between the positive electrode plate and the negative electrode plate to isolate the positive electrode plate from the negative electrode plate. The negative electrode plate includes a negative current collector and a negative active material layer formed on the negative current collector. The positive electrode plate includes a positive current collector and a positive active material layer formed on the positive current collector.

In an embodiment of the present disclosure, the battery cell 5 is a stack-typed cell. That is, the positive electrode plate, the isolation film, and the negative electrode plate are sequentially stacked in that order to form the battery cell 5. Each of the positive electrode plate and the negative electrode plate is substantially circular. Opposite sides of each of the positive electrode plate and the negative electrode plate include cutting edges, and electrode tabs extending from the cutting edges. When being stacked to form the battery cell 5, the battery cell 5 includes a first side and a second side. A plurality of first electrode tabs 6 extends from the first side of the battery cell 5, and are electrically connected to the terminal post 2. A plurality of second electrode tabs 7 extends from the second side of the battery cell 5, and are electrically connected to the casing of the battery. That is, the second electrode tabs 7 are electrically connected to the first casing 1 or the second casing 2. An angle between the extending direction of the first electrode tabs 6 and the extending direction of the second electrode tabs 7 is greater than 0 degree and less than or equal to 180 degree.

In an embodiment of the present disclosure, the first electrode tabs 6 are positive electrode tabs. The second electrode tabs 7 are negative electrode tabs. That is, the terminal post 2 is a positive terminal post. The first casing 1 and the second casing 2 as a whole have a negative polarity. Referring to FIG. 7, in an embodiment of the present disclosure, an insulating adhesive 61 is disposed on the first electrode tabs 6 to isolate the first electrode tabs 6 from the first casing 1. A short circuit is thus avoided. In detail, the first electrode tabs 6 can be connected to the positive current collector by soldering, and can also formed by directly cutting the positive current collector. The second electrode tabs 7 can be connected to the negative current collector by soldering, and can also formed by directly cutting the negative current collector.

Figure 8:
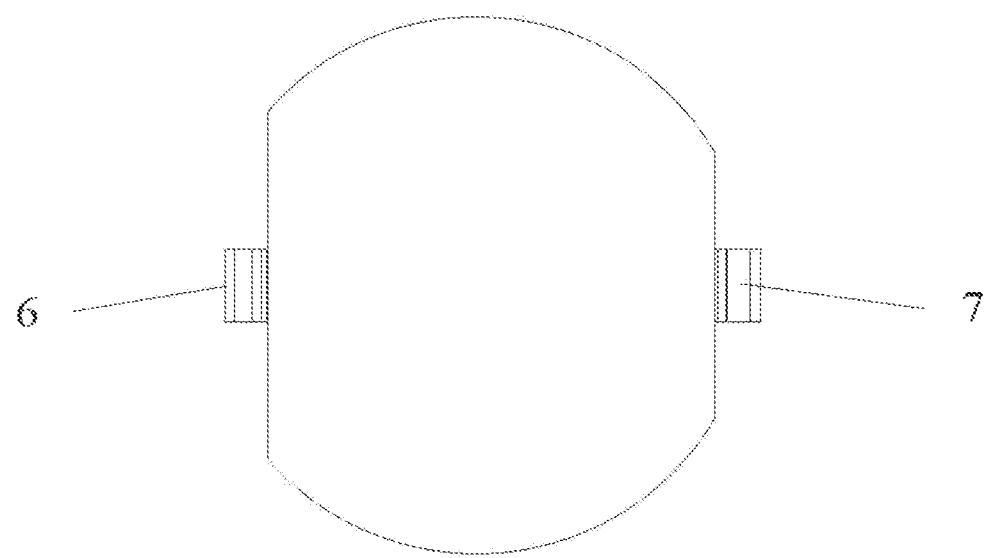
FIG. 8 is a top view of an embodiment of a battery cell according to the present disclosure.

Referring to FIG. 8, in an embodiment of the present disclosure, since the first side of the battery cell 5 faces the position of the terminal post 2, a distance between the first side and the center of circle defined by the battery cell 5 is less than a distance between the second side and the center of circle, which reserves a space for arranging the terminal post.

Figure 9:
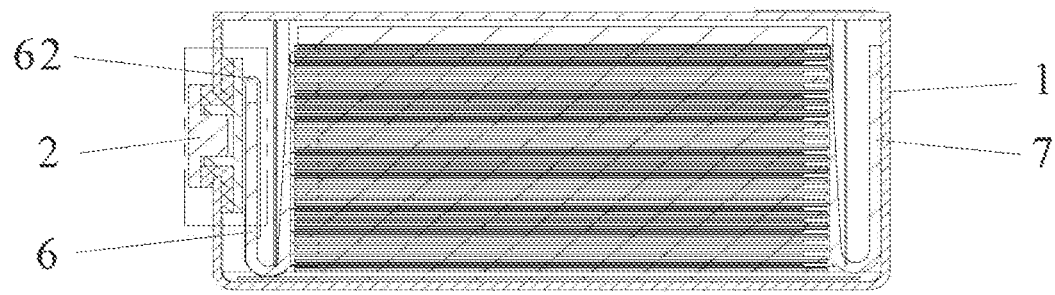
FIG. 9 is a cross-sectional view of yet another embodiment of a battery having a transfer soldering member according to the present disclosure.
Figure 10:
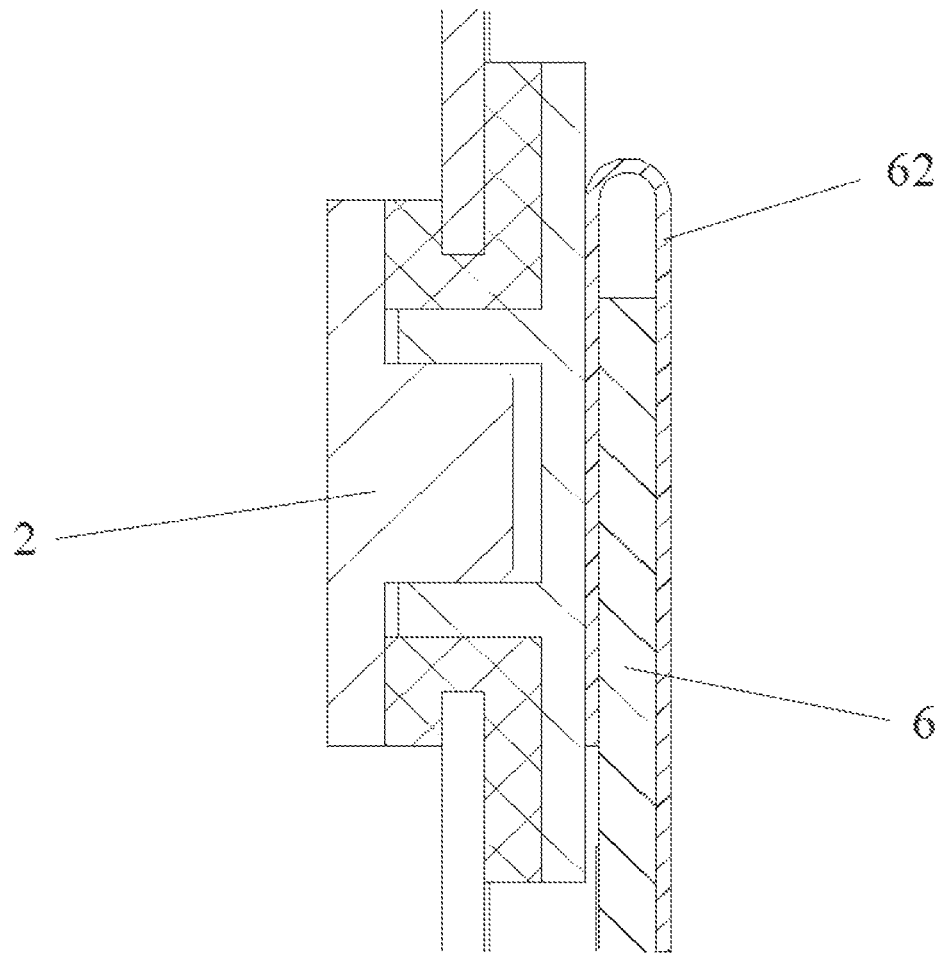
FIG. 10 is an enlarged view of a circled portion of FIG. 9.

Referring to FIGS. 9 and 10, in an embodiment of the present disclosure, the first electrode tabs 6 and the terminal post 2 are electrically connected to each other through a transfer soldering member 62. That is, the first electrode tabs 6 and the terminal post 2 are soldered to each other. In detail, the first electrode tabs 6 are first soldered to the transfer soldering member 62, and the transfer soldering member 62 is then connected to the terminal post 2 by laser soldering.

Referring to FIG. 7, in an embodiment of the present disclosure, the first electrode tabs 6 can also directly be electrically connected to the terminal post 2. That is, the first electrode tabs 6 and the terminal post 2 are directly soldered to each other. In detail, the first electrode tabs 6 can first be integrally formed by soldering, and then soldered to the terminal post 2. Furthermore, when the first cylinder 221 of the terminal post 2 is hollow, the depth of soldering can be decreased when the terminal post 2 and the first electrode tabs 6 are soldered, which also makes the soldered structure more stable.

Figure 11:
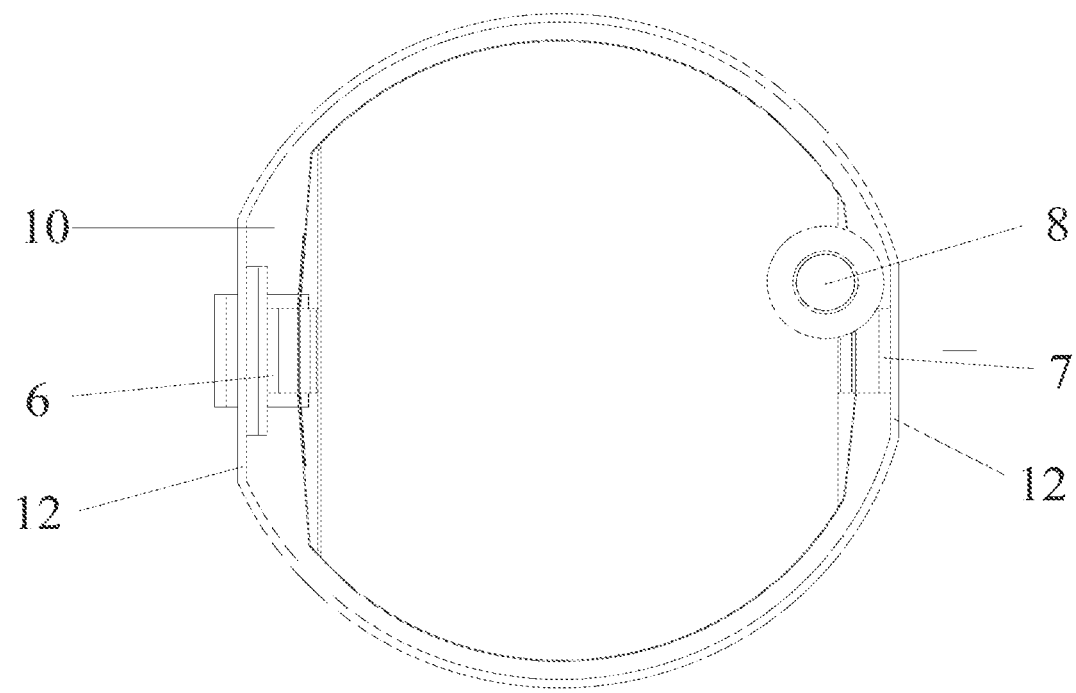
FIG. 11 is a top and perspective view of yet another embodiment of a battery cell according to the present disclosure.

Referring to FIG. 1, in an embodiment of the present disclosure, the first casing 1 of the battery includes one flat sidewall 12 and one first arc sidewall 11. That is, a sidewall corresponding to the first electrode tabs 6 is the flat sidewall 12, in which the terminal post 2 can be disposed to allow the terminal post 2 and the first electrode tabs 6 to be electrically connected to each other. A sidewall of the second electrode tabs 2 is the first arc sidewall. Referring to FIG. 11, in an embodiment of the present disclosure, the first casing 1 of the battery can also include two flat sidewalls 12 and two first arc sidewalls 11. That is, the sidewall corresponding to the first electrode tabs 6 and the sidewall corresponding to the second electrode tabs 7 are the flat sidewalls 12. The energy density can thus be increased.

Referring to FIGS. 1 and 11, the battery of the present disclosure can further include a liquid injection hole 8, through which electrolyte can be injected into the battery to immerse the battery cell 5. In the presence of the first electrode tabs 6 and the second electrode tabs 7, a gap 10 is formed between the battery cell 5 and the casing. The liquid injection hole 8 can be defined on the first casing 1 or the second casing 3, and face the gap 10 between the battery cell 5 and the casing. In the embodiment, the liquid injection hole 8 is defined on a second end surface of the second casing 3, and faces the gap 10 between the second side of the battery cell 5 and the first casing 1. The liquid injection hole 8 is spaced apart from the second electrode tabs 7. As such, the injection of the electrolyte is not hindered, which can fully immerse the battery cell 5. In another embodiment of the present disclosure, the liquid injection hole can also be defined on the second end surface, and face the gap between the first side of the battery cell 5 and the casing. At the first side of the battery cell 5, the first electrode tabs 6 and the terminal post 2 are electrically connected to each other. Thus, the gap between the first side and the casing is greater than the gap between the second side and the casing, which facilitates the injection of the electrolyte. In other embodiments, the liquid injection hole can also be defined on the flat sidewall 12 or the first arc sidewall 11. In addition, a filling plug is inserted into the liquid injection hole 8. The filling plug seals the liquid injection hole 8, and avoids leakage of the electrolyte and prevents external impurities from entering the battery.

Referring to FIG. 1, the battery further includes an explosion relief valve 9. In the embodiment, the explosion relief valve 9 is disposed on the first arc sidewall 11 of the first casing 1, and is spaced apart from the terminal post 2. The explosion relief valve 9 can also be disposed on the first end surface 13 of the first casing 1 or on the second casing 3. In the embodiment, the explosion relief valve 9 is linear, and also can be V-shaped or in shape of a cross. In detail, the thickness of the explosion relief valve 9 is less than the thickness of other portions of the first casing 1. When the internal pressure of the battery is too high, the battery may first be cracked at the explosion relief valve 9, which releases the pressure and ensures the safety of the battery.

Referring to FIG. 7, in an embodiment of the present disclosure, a second insulating member is disposed between the battery cell 5 and the second casing 3. The second insulating member can isolate the battery cell 5 from the second casing 3. A third insulating member is disposed between the battery cell 5 and the first end surface 13 of the first casing 1. A fourth insulating member is disposed between the battery cell 5 and the sidewall of the first casing 1 (that is, the flat sidewall 12 and the first arc sidewall 11). The second, the third, and the fourth insulating members can press and fix the battery cell 5 in the first casing 1 or the second casing 3. The battery cell 5 is thus prevented from moving in the first casing 1 or the second casing 3, and a damage to the electrode plates due to the movement of the battery cell 5 is further avoided. In addition, since the first casing 1 and the second casing 2 as a whole have a same polarity (such as negative polarity), the second, the third, and the fourth insulating members can isolate the battery cell 5 from the first casing 1 and the second casing 3, and a short circuit is thus avoided.

In the embodiment, the first sidewall is the flat sidewall 12. However, the first sidewall can also be a second arc sidewall. The first arc sidewall 11 and the second arc sidewall are connected to each other. The terminal post is disposed on the second arc sidewall. For example, the first arc sidewall and the second arc sidewall as a whole can be a sidewall of a cylinder. The first sidewall can also include the second arc sidewall and the flat sidewall 12. The first arc sidewall 11 and the second arc sidewall are connected to each other. The second arc sidewall and the flat sidewall 12 are connected to each other. The terminal post is disposed on the second arc sidewall or the flat sidewall 12. Or, the first sidewall can include two second arc sidewalls. The flat sidewall 12 is disposed between the two second arc sidewalls.

The disclosure is illustrative only, and changes may be made in the detail, including in matters of shape, size, and arrangement of the parts within the principles of the present disclosure, up to and including the full extent established by the broad general meaning of the terms used in the claims.

It will, therefore, be appreciated that the embodiments described above may be modified within the scope of the claims.

What is claimed is:

1. A battery comprising:
a battery cell; and
a battery casing for receiving the battery cell;
wherein the battery casing comprises a first end plate, a second end plate, a first sidewall and a second sidewall; the first sidewall and the second sidewall are disposed between the first end plate and the second end plate;
wherein the first end plate is in a shape of a circle having a radius R with a segment of the circle cut off at a distance L from the center of the circle, L<R, resulting in an arc edge and a straight edge of the first end plate;
wherein the first sidewall is a flat sidewall connected to the straight edge, the second sidewall is an arc sidewall connected to the arc edge, and the first sidewall and the second sidewall are connected to form a side surface of the battery casing;
wherein a ratio of the distance L to the radius R is between 4:5 and 9:10;
wherein the battery casing further comprises an explosion relief valve disposed on the first end plate or the second end plate, and a terminal post disposed on the first sidewall; and
wherein the terminal post protrudes a distance H1 from the first sidewall, and a total length of L and H1 is less than R.

2. The battery of claim 1, wherein the terminal post comprises a terminal post end parallel to the flat sidewall, a center of the terminal post end is disposed on or above a center of the flat sidewall along a height direction of the flat sidewall, and/or the center of the terminal post end is aligned with a center of the flat sidewall along a width direction of the flat sidewall.

3. The battery of claim 2, wherein the terminal post end is circular, oval, rectangular, or triangular.

4. The battery of claim 1, wherein the terminal post protrudes from the flat sidewall by 0.3 mm to 10 mm.

5. The battery of claim 1, wherein a height of the terminal post, which is perpendicular to the flat sidewall, is 0.6 mm to 20 mm.

6. The battery of claim 1, wherein,
the terminal post comprises a first terminal post portion and a second terminal post portion,
the first terminal post portion comprises a first terminal post end and a first cylinder connected to the first terminal post end,
the second terminal post portion comprises a second terminal post end and a second hollow cylinder connected to the second terminal post end, the second cylinder is hollow, and the first cylinder is inserted into the second hollow cylinder.

7. The battery of claim 1, further comprising:
an insulating member disposed between the terminal post and the flat sidewall, and the insulating member is integrally formed with or made separately.

8. The battery of claim 7, wherein the battery cell further comprises a plurality of first electrode tabs, each of the plurality of first electrode tabs is directly and electrically connected to the terminal post or electrically connected to the terminal post through a transfer soldering member.

9. The battery of claim 8, wherein an insulating adhesive is disposed on the plurality of first electrode tabs.

10. The battery of claim 8, wherein the battery cell further comprises a plurality of second electrode tabs, each of the plurality of second electrode tabs is electrically connected to the first end plate or the second end plate, and an angle between an extending direction of the plurality of first electrode tabs and an extending direction of the plurality of second electrode tabs is greater than 0 degree and less than or equal to 180 degree.

11. The battery of claim 10, wherein a gap is defined around each of the plurality of first electrode tabs and the plurality of second electrode tabs, and the battery further comprises a liquid injection hole disposed on the second casing and facing the gap around the plurality of first electrode tabs.

12. The battery of claim 11, wherein the liquid injection hole is spaced apart from the plurality of second electrode tabs.

13. The battery of claim 6, wherein the first sidewall defines a mounting hole, the terminal post is mounted in the mounting hole, and the first terminal post end and the second terminal post end abut against opposite sides of the mounting hole.

14. The battery of claim 13, wherein a diameter of the mounting hole is less than 1000 millimeters, and a depth of the mounting hole is less than 100 millimeters.

15. The battery of claim 6, wherein the first cylinder is hollow.

* * * * *